United States Patent [19]
Wust

[11] Patent Number: 5,582,262
[45] Date of Patent: Dec. 10, 1996

[54] SELECTIVELY CONNECTABLE ENGINE FOR A VEHICLE HAVING AN ELECTRIC DRIVE MOTOR

[75] Inventor: Bernhard Wust, Steinheim, Germany

[73] Assignee: J. M. Voith GmbH, Heidenheim, Germany

[21] Appl. No.: 325,682

[22] Filed: Oct. 19, 1994

[30] Foreign Application Priority Data

Oct. 20, 1993 [DE] Germany .................. 43 35 849.7

[51] Int. Cl.$^6$ ................................. B60L 9/00
[52] U.S. Cl. ................. 180/2.1; 180/65.4; 191/4
[58] Field of Search ................. 191/4; 180/2.1, 180/65.2, 65.3, 65.4, 65.5; 290/14, 17, 45; 318/148, 153

[56] References Cited

U.S. PATENT DOCUMENTS 5,351,775  10/1994  Johnston et al. .................. 180/65.4

FOREIGN PATENT DOCUMENTS

| 591721 | 7/1925 | France ................ 180/21 |
| 808746 | 2/1937 | France ................ 191/4 |
| 2802635 | 7/1979 | Germany . | |
| 3927453 | 2/1991 | Germany . | |
| 393311 | 5/1933 | United Kingdom ........ 191/4 |
| 833725 | 4/1960 | United Kingdom ....... 180/2.1 |
| 2013149 | 8/1979 | United Kingdom . | |

OTHER PUBLICATIONS

Von Max Eisele, Eriangen; Dual-Power Class 38 Locomotive With Rotary (or three-phase) Drive Technology for the South African Spoornet Railway System; pp. 70–78; ZEV & DET Glas. Ann. 117 (1993) Nr. 2/3 Feb./Mar. (Partial Translation).

*Primary Examiner*—Brian L. Johnson
*Attorney, Agent, or Firm*—Marshall, O'Toole, Gerstein, Murray & Borun

[57] ABSTRACT

A drive device has the following components: a connecting device that can be connected to an electric power supply, the connecting device being connected to a power converter; a first drive aggregate in the form of an electrical drive motor which is connected to the power converter; a second drive aggregate in the form of an internal combustion engine; a generator connected to the internal combustion engine and through the power converter to the electric drive motor; and various auxiliary aggregates. The generator is continuously mechanically connected to the respective auxiliary aggregates while the internal combustion engine is optionally connectable to the auxiliary aggregates as well as to the generator. In a first mode of operation, upon operation of the electric drive motor through the external electric power supply, the generator is separated from the internal combustion engine and the generator, supplied by the power supply, is operated as an electric motor and drives the auxiliary aggregates. In a second mode of operation, upon operation of the electric motor through the internal combustion engine, the internal combustion engine is designed in such a way that it drives the generator and the auxiliary aggregates.

10 Claims, 3 Drawing Sheets

SELECTIVELY CONNECTABLE ENGINE FOR A VEHICLE HAVING AN ELECTRIC DRIVE MOTOR

BACKGROUND OF THE INVENTION

1. Field of the Invention

The invention relates to a drive device for a means of transportation, particularly a trolley bus or rail vehicle.

2. Description of Related Technology

Drive devices for means of transportation, i.e., vehicles, such as trolley buses or rail vehicles, may include an electrical connection device that can be connected to an external electrical power source. The connection device is also connected to a (static) power converter. Such a drive device may further include: a first drive aggregate in the form of an electrical drive motor connected to the power converter; a second drive aggregate in the form of an internal combustion engine; a generator connectable to the internal combustion engine and alternatively connectable via the power converter to the electrical drive motor; and at least one auxiliary aggregate for the vehicle.

Such drive devices are being used in buses, especially in trolley buses or double-decker buses. However, they could also be used in rail vehicles. Such drive devices have the advantage that, in normal operation, the driving of the vehicle is performed via the electrical drive motor. Thus, especially in city traffic, i.e., in highly populated areas, the emission of waste gases and harmful substances is avoided.

The purpose of the addition of an internal combustion engine is to increase the radius of action of the vehicle, because, for example, an overhead trolley system is built only in the central area of the city, and therefore, in the outskirts of the city or on branch lines (detours) another drive aggregate is required.

On the other hand, such internal combustion engines can be used as a second drive aggregate in order to drive the vehicle when breakdowns occur in the external electrical supply network so that the operation of the vehicle can be maintained without disturbance.

In conventional buses (city buses as well as country buses), a number of additional auxiliary aggregates are required, for example, a water pump, an air compressor, and a power-steering pump for power steering. The auxiliary aggregates are driven by the internal combustion engine through one or more V-belts. The internal combustion engines of such conventional buses are designed for this additional power output and the required space for these auxiliary aggregates is available in the vehicle.

However, in trolley buses, such a direct drive of the auxiliary aggregates by the internal combustion engine is usually not possible. The problem arises that the auxiliary aggregates that are connected to the internal combustion engine are no longer driven when, for example in city operation, the drive is performed exclusively electrically, i.e., by the external electrical power supply via the electrical drive motor.

In combined drive devices of the type described herein, therefore, a separate dc on-board system has been installed, for example, with 24 volt dc voltage on the board of a trolley bus, this on-board system being connectable to the external electrical power supply through suitable transformers. Then a number of separate electric motors are connected to this on-board system, each of which drives an auxiliary aggregate. If the driving of the vehicle is performed via the internal combustion engine, for example, if there is trouble in the external electrical power supply, the internal combustion engine also drives an emergency power supply which supplies the on-board system with electrical energy.

It appears that such a design of a drive device with a plurality of parallel and separate auxiliary aggregates, each with their own electric motor and corresponding controls is very expensive and complicated and, moreover, requires significant space. Apart from the considerable cost that arises from the plurality of electric motors and controls, another disadvantage of such a design is the poor degree of cooperation of the drive device arrangement with these additional electrical drive devices.

SUMMARY OF THE INVENTION

It is an object of the invention to overcome one or more of the problems described above. It is also an object of the invention to provide a drive device of the type described herein which has a simplified construction of auxiliary aggregates and cooperating drives as well as to make it possible to place the auxiliary aggregates into a smaller space without adversely influencing the reliability of such components.

According to the invention, a drive device for a vehicle includes an electrical connecting device connected to a power converter and connectable to an electrical power supply, a first drive aggregate in the form of an electric drive motor connected to the power converter, a second drive aggregate in the form of an internal combustion engine, a generator connectable to the internal combustion engine and connectable through the power converter to the electric drive motor, and at least one auxiliary aggregate for the vehicle. Also according to the invention, the generator is constantly mechanically connected to the auxiliary aggregate while the internal combustion engine is optionally connected to the auxiliary aggregate as well as to the generator. Thus, in a first mode of operation of the electrical drive motor through the external electrical power supply, the generator is separated from the internal combustion engine and via the external electrical power supply, the generator is operated as an electric motor, driving the auxiliary aggregate. In a second mode of operation of the electric drive motor through the internal combustion engine, the internal combustion engine drives both the generator and the auxiliary aggregate.

Other objects and advantages of the invention will be apparent to those skilled in the art from the following detailed description taken in conjunction with the drawings and the appended claims.

DETAILED DESCRIPTION OF THE INVENTION

Figure 1:
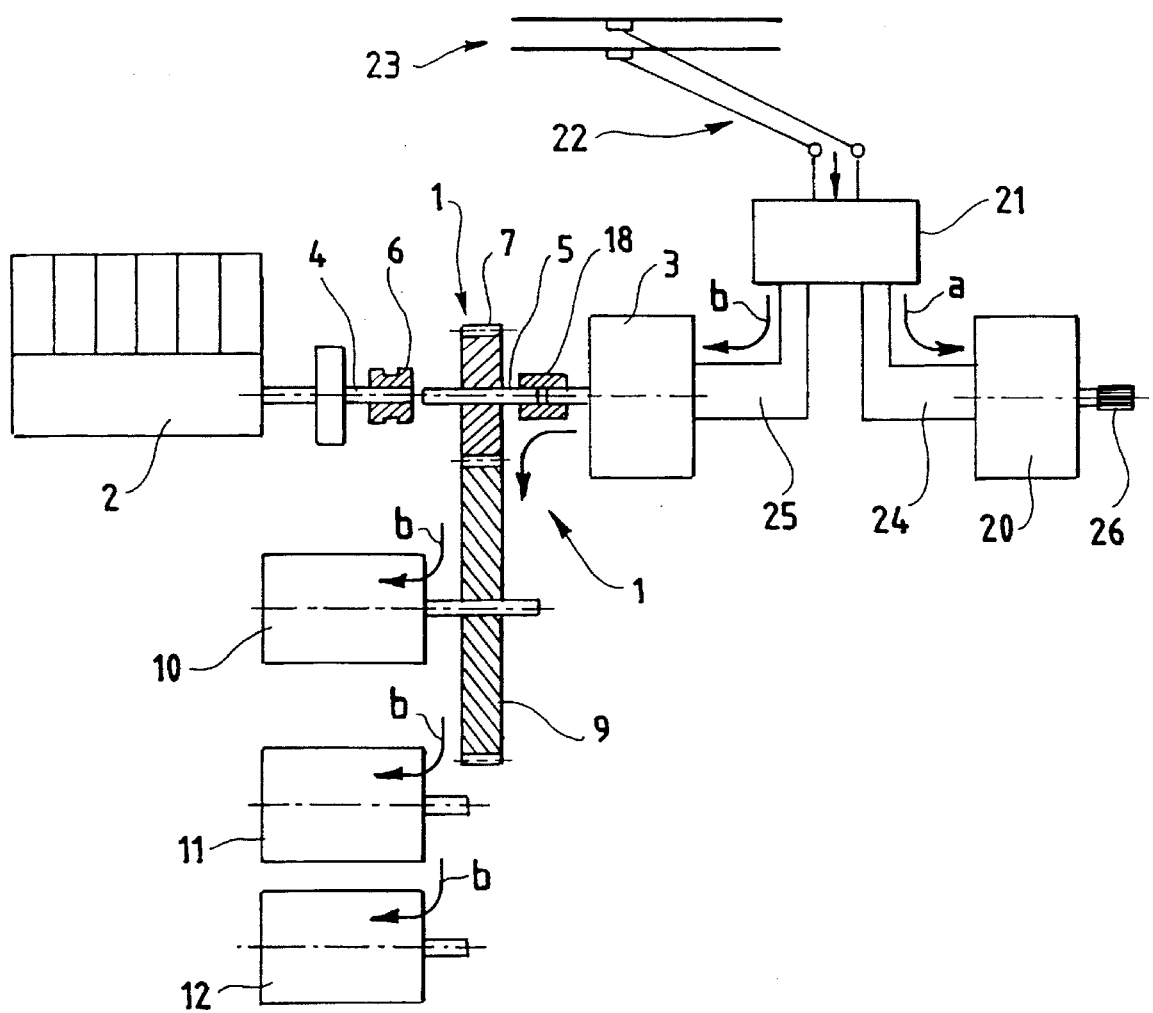
FIG. 1 is a schematic view of a drive device according to the invention shown in a first mode of operation.

According to the invention, a drive device has been designed so that a generator thereof is constantly mechanically connected with respective auxiliary aggregates, while an internal combustion engine can be connected to the auxiliary aggregates as well as to the generator. Thus, on the one hand, during operation of an electrical drive motor by an external electrical supply, the generator is separated (i.e. disconnected) from the internal combustion engine, and the generator, which is supplied by the external electrical power source, is driven as an electric motor and drives the auxiliary aggregates. On the other hand, when the electrical drive motor is operated via the internal combustion engine, the internal combustion engine drives both the generator and the auxiliary aggregates.

In this way, an object of the invention is satisfactorily provided. Separate electric motors with their corresponding controls are not required for the particular auxiliary aggregates. As a result of this, the cost of the vehicle is reduced and the space requirement is also reduced. Since a power converter for the electrical drive motor which has corresponding power electronics is present anyway, this component is utilized for driving all of the auxiliary aggregates so that no additional components are necessary.

In a further embodiment of a drive device according to the invention, a switchable connection between the internal combustion engine on the one hand and the particular auxiliary aggregate on the other hand, has a meshable clutch coupling. Thus, it is possible to connect the respective auxiliary aggregates to the internal combustion engine as a drive aggregate by mechanical means.

Another feature of a drive device according to the invention is that a gear box is provided as a mechanical connection between the internal combustion engine, generator and the respective auxiliary aggregates. In this way, suitable mechanical connection is ensured which takes into consideration the requirements of the particular auxiliary aggregates.

Preferably, several auxiliary aggregates can be connected simultaneously to the generator or optionally to the internal combustion engine.

While the internal combustion engine utilized in the inventive device can be a diesel engine such as those utilized in many types of vehicles, both the generator and the electrical drive motor are preferably designed as transverse-flow machines. Advantageously, the high efficiency of transverse-flow machines can be utilized 90% to 95%. Such transverse-flow machines are known and described, for example, in DE 39 27 453.

In drive devices according to the invention, the internal combustion engine on the one hand and the generator on the other hand are preferably components of an emergency power aggregate or of an alternative or additional power supply for the electrical drive motor. This design makes it possible to ensure driving of the auxiliary aggregates in all cases independently of a disturbance or even failure of the external electrical power supply.

In a further embodiment of a drive device according to the invention, the generator and the electrical drive motor are connectable through a power converter to a trolley system or a live rail as an electrical power supply.

In a preferred embodiment of a drive device according to the invention, the auxiliary aggregates have a steering booster pump, an air compressor, an on-board power generator and/or a water pump. However, additional or other auxiliary aggregates can be provided, for example, heating or cooling aggregates.

In a further embodiment of a drive device according to the invention, the generator can be operated as a starter for the internal combustion engine. In this way, a protected, but reliable starting of the internal combustion engine is provided. Namely, the starting is done at high rpm, so that particle exhaust is reduced in the case of diesel engines.

In addition to the advantages already described herein there are a number of other advantages of a device according to the invention. For example, the total efficiency can be increased, because the on-board system in the drive device according to the invention has an especially high efficiency. On the one hand, an on-board system transformer between the external electrical power supply and the on-board system, as well as the corresponding electric motors, can be omitted, which otherwise bring about relatively high electrical losses. On the other hand, the power requirement from such an on-board system can be reduced, which is manifested in a reduced space requirement and lower costs for the on-board system.

Since the on-board voltage generator as an auxiliary aggregate is driven either by the generator or the internal combustion engine, an on-board power transformer can be omitted, which saves even more space. At the same time, the expenditure for the insulation of the on-board system is reduced because protective insulation (double insulation) against the external electrical power supply is no longer necessary, since, in case of any damage, no galvanic connection can occur to the external electrical power supply, for example, to a trolley system.

With reference to the drawings, FIG. 1 is a schematic diagram showing a first mode of operation of a drive device according to the invention wherein a vehicle (not shown), for example, a trolley bus, is driven by an electric drive motor 20 through a drive pinion 26.

In the first mode of operation shown in FIG. 1, the electrical drive motor 20 is connected via a schematically indicated line 24 to a power converter 21, which is preferably designed as an invertor. The power converter 21 can be connected through an electrical connecting device 22, for example, a horizontal draw-out current collector on the roof of a trolley bus, to a trolley line as an external electrical power supply 23.

The power converter 21 is connected to a generator 3 through another line 25. The generator 3 is preferably a transverse-flow machine which can be driven optionally as a generator or as an electric motor. Preferably, the generator 3 is designed in such a way that it can be operated as a starter for an internal combustion engine 2, with a control (not shown).

A gear box 1 is disposed between the generator 3 and the internal combustion engine 2, which is preferably a diesel engine. The gear box 1 has a first shaft 4 connected to the internal combustion engine 2 and a second shaft 5 connected to the generator 3. At least one gear 7 is mounted on the shaft 5, which is engaged to another gear 9 in order to transfer torque to a corresponding auxiliary aggregate 10.

FIG. 1 shows other auxiliary aggregates 11 and 12, which can be connected in a corresponding manner to the shaft 5, either through corresponding additional gears 7 on the shaft 5 with gears which are not shown, that correspond to the gear 9, or through corresponding gears which are engaged with the gear 9 or the gear 7.

The gear box 1 has a meshable clutch coupling 6 disposed between the shafts 4 and 5, shown in FIG. 1 in an out-of-gear position.

The power flow is indicated schematically in FIG. 1 with the aid of arrows. It can be seen that energy is supplied primarily from the external electrical power supply 23 through the electrical connection device 22 to the power converter 21. From there, in a first branch (indicated by the arrow "a"), the electrical drive motor 20 is supplied with energy and is driven. In a second branch (indicated by the arrows "b"), the energy supply goes to the generator 3 through the line 25. In this type of operation, the generator operates as a drive motor and drives the various drive aggregates 10, 11, 12 through the shaft 5. In this type of operation, the internal combustion engine 2 is not connected (i.e. does not supply energy) to the remainder of the device.

Figure 2:
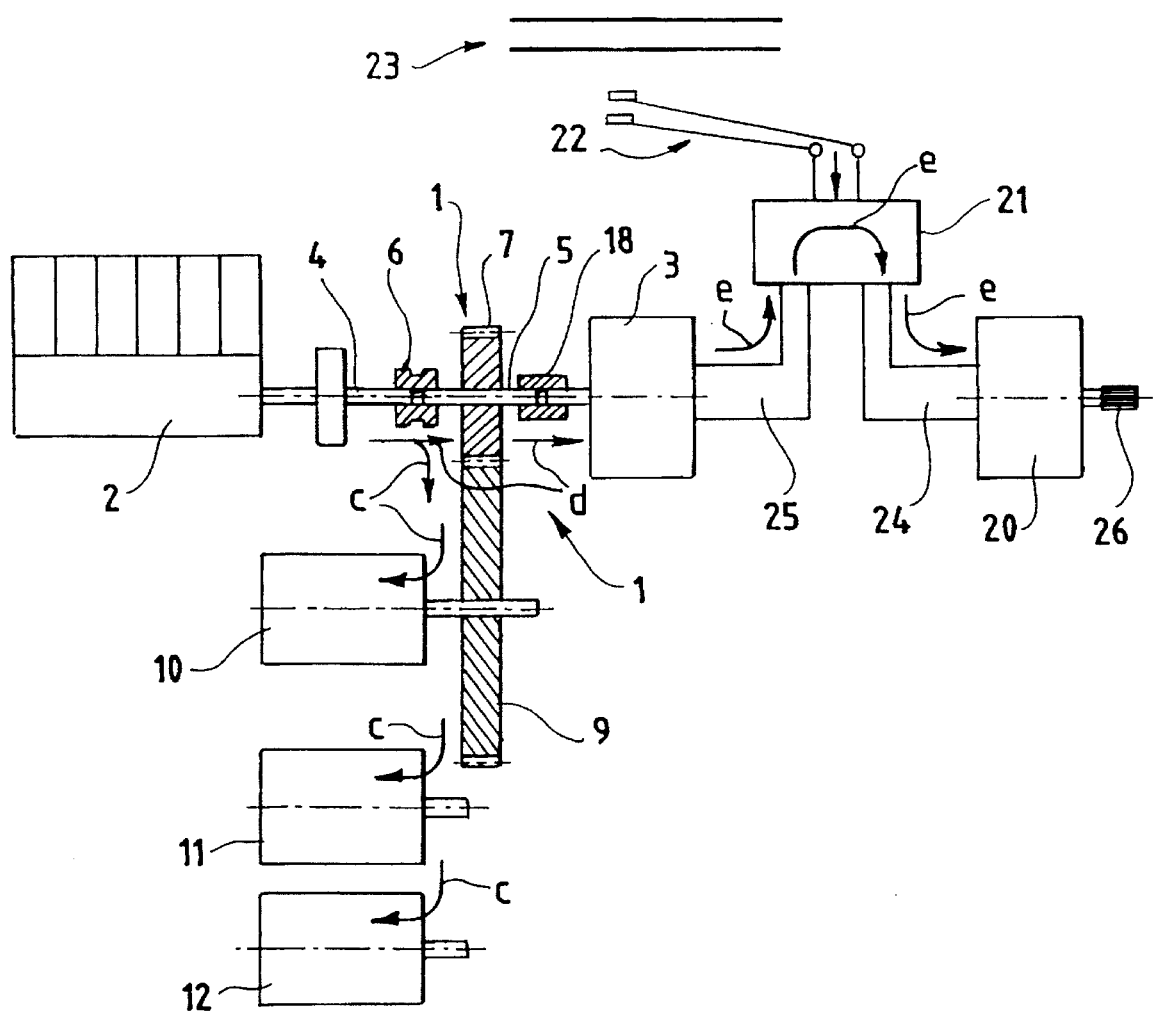
FIG. 2 is a schematic view of the drive device of FIG. 1 shown in a second mode of operation.

FIG. 2 shows a second mode of operation of the inventive drive device. It can be seen that the electrical connecting device 22 is separated from the external electrical power supply 23. In this case, the meshable clutch coupling 6 is put into gear in the gear box 1 so that the internal combustion engine 2 is connected mechanically both to the auxiliary aggregates 10, 11 and 12 as well as to the generator 3.

Here, too, the power flow is indicated with arrows. In a first branch (indicated by the arrows "c"), the internal combustion engine 2 drives the auxiliary aggregates 10, 11 and 12 through the shaft 4, the in-gear clutch coupling 6 and the gear 7. In a second branch (indicated by the arrows "d"), the internal combustion engine 2 drives the generator 3 through the shaft 4, the in-gear clutch coupling 6 and the other shaft 5. The generator 3 now produces the required electrical energy (flow indicated by the arrows "e") to supply the electrical drive motor 20 with current through the line 25, the power converter 21 and the line 24, and to drive it in this way.

Figure 3:
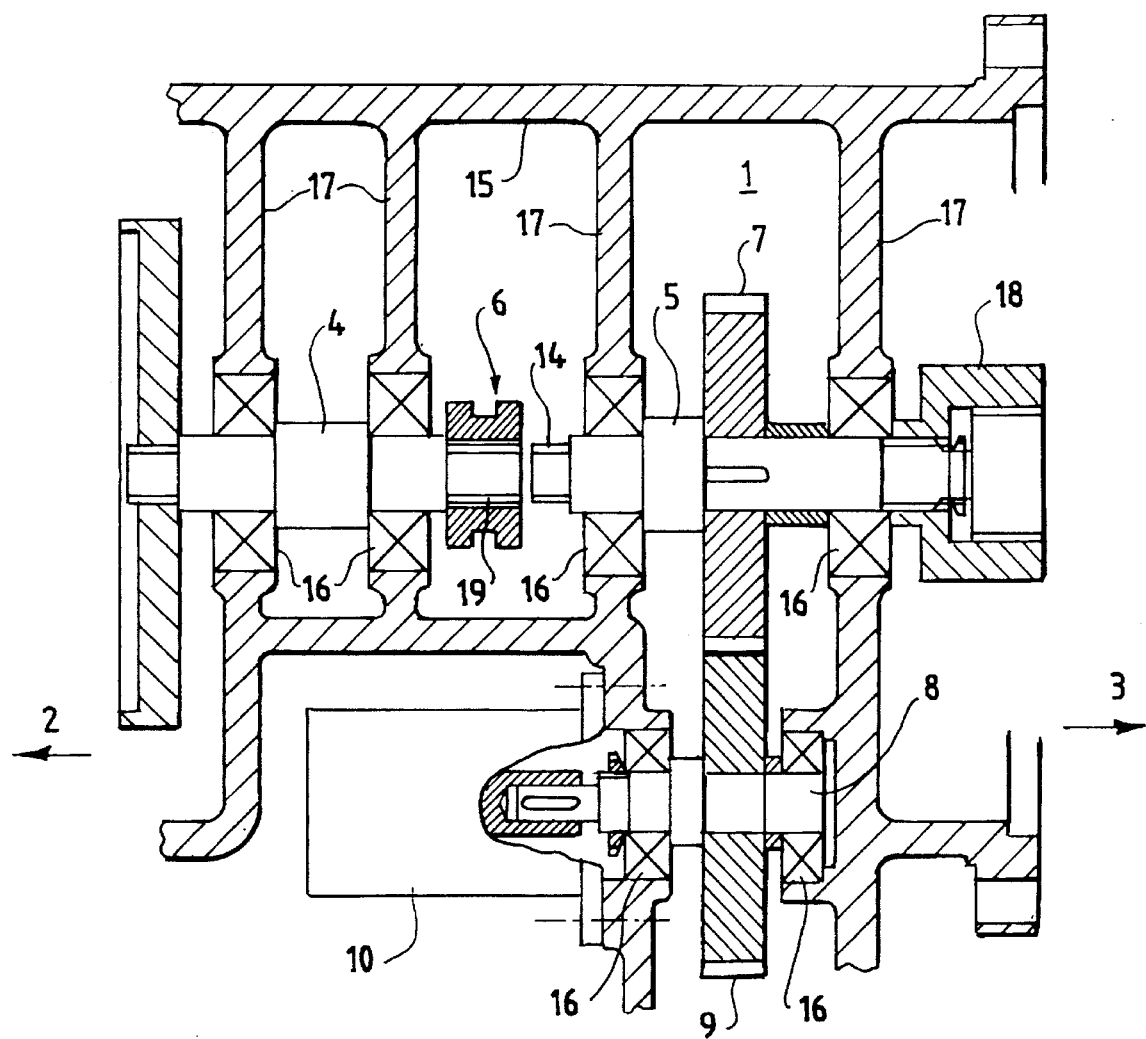
FIG. 3 is an enlarged partially schematic view of a portion of the device of FIG. 1 showing a gear box with a meshable clutch coupling for connection to corresponding auxiliary aggregates.

FIG. 3 shows the details of an embodiment of a gear box 1 according to the invention which can be connected on a left side thereof to the internal combustion engine 2 and on the right side thereof to the generator 3.

In a housing 15 having a plurality of carriers 17, the first shaft 4 and the second shaft 5 are rotatably supported via suitable bearings; the first shaft 4 is connected to the internal combustion engine 2 (not shown in FIG. 3), while the second shaft 5 is connected through a coupling 18 to the generator 3 (not shown in FIG. 3).

The shaft 4 is provided with the meshable clutch coupling 6 on an end thereof disposed away from the internal combustion engine 2, this coupling having an outer ring 19, which can be brought to engagement with a coupling tappet 14 of the shaft 5 when the clutch coupling 6 is in gear.

The first gear 7 is seated on the shaft 5 and meshes with another gear 9 on the shaft 8 and serves to drive the auxiliary aggregate 10. For this purpose, the shaft 8 of the gear 9 is supported in a corresponding bearing 16, mounted in carriers shown schematically in FIG. 3.

The other auxiliary aggregates 11 and 12, shown schematically in FIGS. 1 and 2, as well as other auxiliary aggregates (not shown) are connected correspondingly mechanically with the shaft 5 whereby the corresponding gears 9 of these auxiliary aggregates mesh either with one gear 7 or with additional gears 7 on the shaft 5.

The auxiliary aggregates 10, 11, and 12 may include a steering booster pump for the power steering of a vehicle, an air presser (air compressor), an on-board system generator, a water pump, a heating device and a cooling device (air conditioner compressor) for the particular means of transportation. The number of connectable auxiliary aggregates are not limited in any way and are chosen depending on the practical requirements of the vehicle.

Drive devices according to the invention as described herein satisfy practical vehicle operating requirements to a full extent and, at the same time, are reliable and space-saving. Whether or not energy is obtained from external electrical power sources, reliable operation of all drive aggregates is ensured.

The use of transverse-flow machines for the generator 3 and the electric drive motor 20 makes it possible to have a design with high efficiency achieved with a smaller number of components.

When the generator 3 is equipped with an energy saver, which is not shown here, the generator 3 can be used as a drive motor so that even if the external electrical power supply is shut down, it can serve as a starter for the internal combustion engine 2. In this way, an additional starter can be omitted.

Even when the generator 3 is still connected through the power converter 21 and the electrical connecting device 22 to the external electrical power supply 23, the generator 3 can still work as a starter for the internal combustion engine 2. This may be expedient in situations in which the supply voltage in the external electrical power supply fluctuates greatly so that a decision is made to use the internal combustion engine 2. Also, in situations in which the edge region of a trolley network system is reached (i.e., a city boundary), the energy of the external electrical power supply 23 can be utilized to start the internal combustion engine 2 through the generator 3.

In another embodiment of a device according to the invention not shown in the drawings, the drive device can also be connected to an internal electrical power supply, for example, to a battery, allowing for operation in the battery mode. This is preferable, for example, when the vehicle passes through a passenger zone where no trolley line is present. Then, the internal combustion engine remains turned off and the operation of the electrical drive motor and the auxiliary aggregates is ensured through the internal electrical power supply from the battery through the power converter.

The foregoing detailed description is given for clearness of understanding only, and no unnecessary limitations should be understood therefrom, as modifications within the scope of the invention will be apparent to those skilled in the art.

I claim:

1. In a drive device for a vehicle comprising an electrical connecting device connected to a power converter and connectable to an electrical power supply, a first drive aggregate in the form of an electric drive motor connected to the power converter, a second drive aggregate in the form of an internal combustion engine, a generator connectable to the internal combustion engine and connectable through the power converter to the electric drive motor, and at least one auxiliary aggregate for the vehicle, the improvement wherein the generator is constantly mechanically connected to the auxiliary aggregate while the internal combustion engine is connectable to the auxiliary aggregate and the generator such that, in a first mode of operation of the electrical drive motor through an external electrical power supply, the generator is disconnected from the internal combustion engine and wherein the generator is supplied by the external electrical power supply and is operated as an electric motor and drives the auxiliary aggregate, and during a second mode of operation of the electric drive motor through the internal combustion engine, the internal combustion engine drives both the generator and the auxiliary aggregate.

2. The improvement of claim 1 further comprising a switchable connection between the internal combustion engine and the auxiliary aggregate having a meshable clutch coupling.

3. The improvement of claim 1 further comprising a gear box providing a mechanical connection between the internal combustion engine, the generator, and the auxiliary aggregate.

4. The improvement of claim 1 wherein a plurality of auxiliary aggregates are connected simultaneously to the generator and optionally to the internal combustion engine.

5. The improvement of claim 1 wherein the internal combustion engine is a diesel engine.

6. The improvement of claim 1 wherein the generator and the electric drive motor are designed as transverse-flow machines.

7. The improvement of claim 1 wherein the internal combustion engine and the generator are components of at least one of an emergency power aggregate, an alternative power supply for the electric drive motor, and an additional power supply for the electric drive motor.

8. The improvement of claim 1 wherein the generator and the electric drive motor are connected through the power converter to the external electrical power supply selected from the group consisting of a trolley line and a live rail.

9. The improvement of claim 1 comprising a plurality of auxiliary aggregates selected from the group consisting of a steering booster pump, an air compressor, an on-board system generator, and a water pump.

10. The improvement of claim 1 wherein the generator is operated as a starter for the internal combustion engine.

* * * * *